United States Patent
Sawa et al.

(10) Patent No.: US 9,852,483 B2
(45) Date of Patent: Dec. 26, 2017

(54) FORECAST SYSTEM AND METHOD OF ELECTRIC POWER DEMAND

(75) Inventors: Toshiyuki Sawa, Tokyo (JP); Shigeki Mori, Tokyo (JP); Jun Yamazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 386 days.

(21) Appl. No.: 14/238,309

(22) PCT Filed: Aug. 14, 2012

(86) PCT No.: PCT/JP2012/070669
§ 371 (c)(1),
(2), (4) Date: Feb. 11, 2014

(87) PCT Pub. No.: WO2013/042493
PCT Pub. Date: Mar. 28, 2013

(65) Prior Publication Data
US 2014/0222228 A1 Aug. 7, 2014

(30) Foreign Application Priority Data
Sep. 20, 2011 (JP) .................. 2011-204049

(51) Int. Cl.
*H02J 3/00* (2006.01)
*G06Q 50/06* (2012.01)
*G06Q 10/04* (2012.01)

(52) U.S. Cl.
CPC .......... *G06Q 50/06* (2013.01); *G06Q 10/04* (2013.01); *H02J 3/00* (2013.01); *H02J 2003/003* (2013.01); *Y04S 10/54* (2013.01)

(58) Field of Classification Search
CPC . G06Q 50/06; G06Q 10/04; H02J 3/00; H02J 2003/003; Y04S 10/54
(Continued)

(56) References Cited

U.S. PATENT DOCUMENTS 7,711,655 B2 * 5/2010 Abe ................. G06Q 10/06 705/400
2002/0019762 A1 * 2/2002 Tomita ............ G06Q 10/06 700/291

(Continued)

FOREIGN PATENT DOCUMENTS

| JP | 5-38051 A | 2/1993 |
| JP | 9-233700 A | 9/1997 |

(Continued)

OTHER PUBLICATIONS

International Search Report (PCT/ISA/210) with English translation dated Oct. 23, 2012 (Four (4) pages).

(Continued)

*Primary Examiner* — Robert Fennema
*Assistant Examiner* — Jigneshkumar Patel
(74) *Attorney, Agent, or Firm* — Crowell & Moring LLP

(57) ABSTRACT

A plurality of forecast weather groups in a period comprising a plurality of days including a forecast target day for forecasting the electric power demand, and a plurality of actual weather groups in a period in a plurality of days in the past are set as the target period, and the similarity between the forecast weather group and the plurality of actual weather groups is calculated, a trend of a subsequent electric power demand is predicted based on the comparison of the plurality of calculated similarities whereby the electric power demand of a forecast target day is known.

7 Claims, 17 Drawing Sheets

(58) Field of Classification Search
USPC .......................................................... 700/291
See application file for complete search history.

(56) References Cited

U.S. PATENT DOCUMENTS

| | | | | |
|---|---|---|---|---|
| 2010/0222934 A1* | 9/2010 | Iino | ................. | G06Q 30/02 |
| | | | | 700/291 |
| 2011/0072085 A1* | 3/2011 | Standley | ........... | G06F 17/30038 |
| | | | | 709/204 |
| 2011/0231320 A1* | 9/2011 | Irving | .................... | G06Q 30/00 |
| | | | | 705/80 |
| 2012/0150707 A1* | 6/2012 | Campbell | .............. | G06Q 30/04 |
| | | | | 705/34 |
| 2013/0024141 A1* | 1/2013 | Marwah | ................ | G06Q 50/06 |
| | | | | 702/61 |

FOREIGN PATENT DOCUMENTS

| | | |
|---|---|---|
| JP | 2004-164388 A | 6/2004 |
| JP | 2009-294969 A | 12/2009 |

OTHER PUBLICATIONS

Haida, "Study on Daily Electric Load Curve Forecasting Method Based on Regression Type Hourly Load Modeling with Yearly Load Trends, Day-types and Insolations", Institute of Electrical Engineers of Japan, Publication of Power and Energy vol. 129, No. 12, pp. 1477-1485, (Ten (10) pages).

Indian Examination Report issued in counterpart Indian Application No. 2588/DEL/2012 dated Jul. 28, 2017 with English translation (Six (6) pages).

\* cited by examiner

FIG. 4

| DAY | DEMAND | TEMPERATURE (°C) | | | HUMIDITY(%) | | ... | DAY OF THE WEEK | SINGULARITY | ABNORMAL DEMAND |
| --- | --- | --- | --- | --- | --- | --- | --- | --- | --- | --- |
| | | AVERAGE | HIGHEST | LOWEST | AVERAGE | LOWEST | | | | |
| 1 | 3019 | 27.0 | 29.5 | 24.8 | 73 | 61 | ... | THURSDAY | NORMAL DAY | 0 |
| 2 | 3133 | 26.6 | 31.0 | 23.1 | 71 | 57 | ... | FRIDAY | NORMAL DAY | 0 |
| 3 | 2068 | 26.2 | 28.8 | 24.3 | 74 | 65 | ... | SATURDAY | NORMAL DAY | 0 |
| 4 | 1900 | 27.2 | 31.6 | 24.3 | 78 | 58 | ... | SUNDAY | NORMAL DAY | 0 |
| 5 | 3048 | 26.8 | 30.3 | 24.9 | 77 | 63 | ... | MONDAY | NORMAL DAY | 0 |
| 6 | 3123 | 27.1 | 30.6 | 24.2 | 76 | 63 | ... | TUESDAY | NORMAL DAY | 0 |
| 7 | 2793 | 25.4 | 27.8 | 22.9 | 79 | 68 | ... | WEDNESDAY | NORMAL DAY | 0 |
| 8 | 3092 | 26.4 | 30.1 | 23.2 | 75 | 58 | ... | THURSDAY | NORMAL DAY | 0 |
| 9 | 2857 | 25.5 | 27.8 | 22.7 | 78 | 66 | ... | FRIDAY | NORMAL DAY | 0 |
| 10 | 2237 | 27.3 | 31.1 | 23.6 | 64 | 45 | ... | SATURDAY | NORMAL DAY | 0 |
| 11 | 1756 | 26.3 | 28.9 | 24.4 | 74 | 59 | ... | SUNDAY | NORMAL DAY | 0 |
| 12 | 2962 | 27.4 | 29.1 | 26.2 | 75 | 69 | ... | MONDAY | NORMAL DAY | 0 |
| 13 | 2752 | 23.8 | 27.2 | 19.9 | 79 | 74 | ... | TUESDAY | NORMAL DAY | 0 |
| 14 | 3158 | 26.1 | 31.3 | 20.0 | 75 | 61 | ... | WEDNESDAY | NORMAL DAY | 0 |
| 15 | 3200 | 28.4 | 31.4 | 26.4 | 68 | 56 | ... | THURSDAY | NORMAL DAY | 0 |
| 16 | 3263 | 28.5 | 31.9 | 25.8 | 70 | 57 | ... | FRIDAY | NORMAL DAY | 0 |
| 17 | 2297 | 28.3 | 32.1 | 26.0 | 69 | 53 | ... | SATURDAY | NORMAL DAY | 0 |
| 18 | 1924 | 28.3 | 31.7 | 25.6 | 68 | 55 | ... | SUNDAY | NORMAL DAY | 0 |
| 19 | 2115 | 29.8 | 34.5 | 26.1 | 61 | 45 | ... | MONDAY | HOLIDAY | 0 |
| 20 | 3537 | 30.8 | 34.5 | 27.3 | 62 | 42 | ... | TUESDAY | NORMAL DAY | 0 |
| 21 | 3703 | 31.5 | 36.3 | 28.0 | 61 | 39 | ... | WEDNESDAY | NORMAL DAY | 0 |
| 22 | 3624 | 31.4 | 36.1 | 27.6 | 60 | 34 | ... | THURSDAY | NORMAL DAY | 0 |
| 23 | 3634 | 30.8 | 35.7 | 26.8 | 65 | 47 | ... | FRIDAY | NORMAL DAY | 0 |
| 24 | 2537 | 30.8 | 35.8 | 26.5 | 63 | 47 | ... | SATURDAY | NORMAL DAY | 0 |
| 25 | 2096 | 29.5 | 34.4 | 25.5 | 64 | 54 | ... | SUNDAY | NORMAL DAY | 0 |
| 26 | 3365 | 28.6 | 33.3 | 25.7 | 71 | 57 | ... | MONDAY | NORMAL DAY | 0 |
| 27 | 3422 | 29.8 | 33.8 | 26.1 | 64 | 52 | ... | TUESDAY | NORMAL DAY | 0 |
| 28 | 3472 | 30.0 | 34.2 | 27.3 | 59 | 44 | ... | WEDNESDAY | NORMAL DAY | 0 |
| 29 | 2840 | 26.3 | 27.9 | 24.4 | 76 | 65 | ... | THURSDAY | NORMAL DAY | 0 |
| 30 | 2964 | 26.8 | 29.2 | 25.3 | 82 | 73 | ... | FRIDAY | NORMAL DAY | 0 |
| 31 | 2298 | 29.2 | 32.2 | 26.8 | 74 | 58 | ... | SATURDAY | NORMAL DAY | 0 |

FIG. 6

| | ACTUAL | | | | FORECAST | | |
|---|---|---|---|---|---|---|---|
| | NUMBER OF DAYS | END | START | NUMBER OF DAYS | END | START |
| FORECAST WEATHER GROUP | 10 | JULY 10, 2011 | JULY 1, 2011 | 1 | JULY 11, 2011 | JULY 11, 2011 |
| ACTUAL WEATHER GROUP | 11 | JULY 31, 2010 | JULY 1, 2010 | | | |
| | | JULY 31, 2009 | JULY 1, 2009 | | | |

CLOSE

FIG. 7

| BAROMETRIC PRESSURE (hPa) | | AMOUNT OF RAINFALL (mm) | | | | TEMPERATURE (°C) | | | HUMIDITY (%) | |
|---|---|---|---|---|---|---|---|---|---|---|
| ACTUAL PLACE | SEA LEVEL | TOTAL | MAXIMUM | | | AVERAGE | HIGHEST | LOWEST | AVERAGE | LOWEST |
| AVERAGE | AVERAGE | | 1 HOUR | 10 MINUTES | | | | | | |
| ADOPT OR NOT ADOPT | × | × | × | × | | ○ | ○ | ○ | ○ | × |
| WEIGHTING | 0.00 | 0.00 | 0.00 | 0.00 | | 0.33 | 0.33 | 0.33 | 1.00 | 0.00 |

| WIND DIRECTION/WIND SPEED (m/s) | | | | | DAYLIGHT HOURS (h) | SNOW (cm) | | | GENERAL WEATHER OUTLOOK | |
|---|---|---|---|---|---|---|---|---|---|---|
| AVERAGE WIND SPEED | MAXIMUM WIND SPEED | | MAXIMUM INSTANTANEOUS WIND SPEED | | | SNOWFALL | DEEPEST SNOW | | DAYTIME (06:00–18:00) | NIGHTTIME (18:00–NEXT DAY 06:00) |
| | WIND SPEED | WIND DIRECTION | WIND SPEED | WIND DIRECTION | | TOTAL | VALUE | | | |
| ADOPT OR NOT ADOPT × | × | × | × | × | × | × | × | | × | × |
| WEIGHTING 0.00 | 0.00 | 0.00 | 0.00 | 0.00 | 0.00 | 0.00 | 0.00 | | 0.00 | 0.00 |

CLOSE

FIG. 8

| | | WHOLE GROUP | | | | BASE |
|---|---|---|---|---|---|---|
| | INDIVIDUAL GROUP AVERAGE METHOD | AVERAGE | MAXIMUM | MINIMUM | STANDARD DEVIATION | |
| EUCLIDEAN DISTANCE | ○ | × | × | × | × | 10 |
| VECTOR ANGLE SIMILARITY | × | × | × | × | × | 0 |

CLOSE

FIG. 10

| SELECT | DAY | DISTANCE | HIGHEST TEMPERATURE | LOWEST TEMPERATURE | AVERAGE TEMPERATURE | AVERAGE HUMIDITY |
|---|---|---|---|---|---|---|
| ○ | 10 | 18 | 15.3 | 12.4 | 9.0 | 5.9 |
| ○ | 11 | 16 | 14.7 | 10.7 | 8.7 | 4.8 |
| ○ | 12 | 14 | 11.3 | 10.0 | 7.3 | 4.6 |
| ◉ | 13 | 13 | 11.7 | 9.0 | 6.9 | 3.9 |
| ○ | 14 | 15 | 13.3 | 10.1 | 8.0 | 4.6 |
| ○ | 15 | 16 | 14.0 | 11.4 | 8.2 | 4.9 |
| ○ | 16 | 19 | 16.6 | 12.7 | 9.6 | 6.2 |
| ○ | 17 | 20 | 17.7 | 13.4 | 10.9 | 6.2 |
| ○ | 18 | 22 | 18.0 | 14.8 | 11.4 | 7.4 |
| ○ | 19 | 19 | 16.4 | 13.3 | 10.3 | 5.8 |
| ○ | 20 | 18 | 14.9 | 12.4 | 9.8 | 5.8 |
| ○ | 21 | 17 | 15.3 | 11.5 | 8.6 | 5.3 |
| ○ | 22 | 19 | 15.4 | 13.3 | 10.5 | 6.1 |
| ○ | 23 | 20 | 17.9 | 13.3 | 10.7 | 6.2 |
| ○ | 24 | 21 | 17.0 | 14.0 | 11.1 | 7.1 |
| ○ | 25 | 20 | 17.9 | 13.9 | 10.6 | 6.0 |
| ○ | 26 | 23 | 20.1 | 15.9 | 11.8 | 7.2 |
| ○ | 27 | 25 | 21.2 | 17.2 | 13.3 | 7.9 |
| ○ | 28 | 22 | 18.8 | 14.9 | 11.0 | 7.2 |
| ○ | 29 | 20 | 16.2 | 13.6 | 10.2 | 6.8 |
| ○ | 30 | 24 | 19.7 | 15.9 | 13.0 | 8.0 |
| ○ | 31 | 25 | 21.6 | 16.4 | 13.3 | 8.1 |
| WEIGHTING FACTOR | | | 0.33 | 0.33 | 0.33 | 1 |

[GRAPH OF SIMILARITY] [GRAPH OF VARIABLE] [CLOSE]

FIG. 14

| | BAROMETRIC PRESSURE (hPa) | | AMOUNT OF RAINFALL (mm) | | | | TEMPERATURE (°C) | | | HUMIDITY (%) | |
|---|---|---|---|---|---|---|---|---|---|---|---|
| | ACTUAL PLACE | SEA LEVEL | TOTAL | MAXIMUM | | | AVERAGE | HIGHEST | LOWEST | AVERAGE | LOWEST |
| | AVERAGE | AVERAGE | | 1 HOUR | 10 MINUTES | | | | | | |
| ADOPT OR NOT ADOPT | × | × | × | × | × | | ○ | ○ | ○ | ○ | × |

| | WIND DIRECTION/WIND SPEED (m/s) | | | | | DAYLIGHT HOURS (h) | SNOW (cm) | | GENERAL WEATHER OUTLOOK | |
|---|---|---|---|---|---|---|---|---|---|---|
| | AVERAGE | MAXIMUM WIND SPEED | | MAXIMUM INSTANTANEOUS WIND SPEED | | | SNOWFALL | DEEPEST SNOW | DAYTIME | NIGHTTIME |
| | WIND SPEED | WIND SPEED | WIND DIRECTION | WIND SPEED | WIND DIRECTION | | TOTAL | VALUE | (06:00–18:00) | (18:00–NEXT DAY 06:00) |
| ADOPT OR NOT ADOPT | × | × | × | × | × | × | × | × | × | × |

CLOSE

FIG. 15

| | DECREASING RATE |
|---|---|
| MONDAY | 1.00 |
| TUESDAY | 1.00 |
| WEDNESDAY | 1.00 |
| THURSDAY | 1.00 |
| FRIDAY | 1.00 |
| SATURDAY | 0.70 |
| SUNDAY | 0.60 |
| HOLIDAY | 0.60 |
| GW | 0.55 |
| BON FESTIVAL | 0.55 |
| YEAR END/ NEW YEAR DAYS | 0.55 |

CLOSE

FIG. 16

| | ACTUAL | | | | FORECAST | | | RATE OF INCREASE |
|---|---|---|---|---|---|---|---|---|
| | NUMBER OF DAYS | END | START | | NUMBER OF DAYS | END | START | |
| FORECAST WEATHER GROUP | 10 | JULY 10, 2011 | JULY 1, 2011 | | 1 | JULY 11, 2011 | JULY 11, 2011 | 1.00 |
| ACTUAL WEATHER GROUP | 11 | JULY 23, 2010 | JULY 13, 2010 | | | | | 0.98 |
| | | | | | | | | |
| | | | | | | | | |

FIG. 17

| DATE | DEMAND FORECAST | HIGHEST TEMPERATURE | LOWEST TEMPERATURE | AVERAGE TEMPERATURE | AVERAGE HUMIDITY |
|---|---|---|---|---|---|
| JULY 15, 2011 | 3250 | 34.0 | 28.0 | 30.0 | 68.0 |

CLOSE

FORECAST SYSTEM AND METHOD OF ELECTRIC POWER DEMAND

TECHNICAL FIELD

The present invention relates to electric power demand forecast systems and methods for predicting, based on the weather record and actual electric power demand data in the past and the forecast weather data in the future, a subsequent electric power demand.

In order to supply stable and reliable electric power to consumers, the supplier side needs to know the needs of consumers in electric power demand, and needs to implement an operation plan of power plants and perform frequency control using a power converter and the like based on this knowledge, thereby supplying electric power. Thus, the supplier side can stably and efficiently perform the operations from power generation to power transmission with no waste, while the consumer side can also enjoy stable power supply following its own needs.

In order to know the electric power demand, there is an approach of predicting the electric power demand using weather data and the like. Because the electric power demand is considered to have a correlation with changes in weather, techniques have been invented for predicting, based on the weather record and actual demand data in the past, the electric power demand in the future. Patent Literature 1 (JP-A-2009-294969) describes a demand forecast method of calculating a demand forecast, which varies with the weather, for a predetermined forecast period, wherein correlation data for a predetermined similar period similar to the forecast period is obtained using correlation data between weather records in the past and actual demand records in the past; and wherein demand forecast is made by calculating demand forecast values for the forecast period and a probability distribution of the demand forecast values from weather forecast values for the forecast period and weather forecast probability distribution data in a probability distribution of the weather forecast values. Patent Literature 2 (JP-A-2004-164388) describes a demand forecast system targeting at power and heat supply plants and having a function to forecast the power and/or heat demands of the next day and a function to manage the operation history, such as operation records and/or energy selling amount records, the system including: a unit configured to acquire weather information of the next day; and a forecast calculation unit configured to construct a forecast model and derive a forecast demand value based on a multiple regression analysis algorithm using actual demand records in the past and the weather information. Furthermore, Non-Patent Literature 1 ("Study on Daily Electric Load Curve Forecasting Method based on Regression Type Hourly Load Modeling with Yearly Load Trends, Day-types and Insolations" Institute of Electrical Engineers of Japan, Publication of Power and Energy Vol. 129, No. 12, pp. 1477-1485) describes a technique, wherein when the demand of the next day is predicted, a regression model of the weather and demand is prepared using weather records and actual demand data of a forecast target day and of the previous and next dates based on the weather records and actual demand data until the previous day and a calendar, and wherein a demand is predicted by inputting the weather forecast of the forecast target day into this regression model.

SUMMARY OF INVENTION

The problem to be solved by the present invention is as follows. Due to yearly changes in weather environments and the like, even if an electric power demand in the future is predicted from the weather records and actual demand data of the same day, the same week, and the same month in the past, the forecast may lack of accuracy or reliability. For example, in summertime, if the highest temperature varies by 1° C., the electric power demand may also vary by 3%, so if the highest temperature varied by 12° C., the electric power demand would also vary by 12%. Therefore, the use of the weather data, wherein the highest temperature of the same day, the week, and the same month in the past greatly varies by several degrees C. or more, might lead to a decrease in accuracy of the demand forecast.

In the invention of Patent Literature 1, examples of setting a similar day with respect to an electric power demand forecast day include: a case where a day in the past when the season becomes the same and the month, week, and day of the week become the same is set to the similar day; a case where a day in the past when the month and day of the week become the same is set to the similar day; and a case where a day in the past when the month and week become the same is set to the similar day. Non-Patent Literature 1 also describes that based on a calendar, the weather records and actual demand data for a period before or after a forecast target day of the previous year, the year prior to the previous year, and so on are used. Therefore, the technique of Non-Patent Literature 1 is subject to a decrease in accuracy of the demand forecast described above.

Moreover, the invention of Patent Literature 2 described above also describes that similarity with the forecast day's weather is calculated based on selected search items (temperature and the like), and for all the target days for a search period, the similarity with the forecast day's weather is calculated, and a day with the smallest variance is set to the similar weather day. Here, calculation is made for each day, and therefore if information, such as the forecast temperature and the like of the forecast day, is not accurate and is wrong, then the similar weather day is also set to a day lacking of accuracy of the information, and as a result, the electric power demand forecast of the forecast day based on the similar weather day cannot assure the accuracy/reliability as prediction accuracy.

Then, the challenge of the present invention is to more accurately know the electric power demand of a forecast target day taking into consideration also changes in the weather environment or the like for each year, and without using, as is, the weather records and actual demand data of the same day, the same week, the same month, and the same season in the past, and even if the forecast weather data of the forecast target day has an error.

As a unit configured to solve the problem, there is provided an electric power demand forecast system, which calculates a similarity between a weather record in the past and subsequent forecast weather data, and with the use of the similarity, which predicts a subsequent electric power demand from forecast weather data of a forecast target day and electric power demand data corresponding to the weather record, the system including: a demand forecast target setting unit configured to carry out condition setting for calculating the similarity; a similar period search condition setting unit configured to set a target period in which the similarity is calculated; a similarity calculation unit configured to calculate the similarity based on the condition set by the demand forecast target setting unit and the target period set by the similar period search condition setting unit; a demand forecast model construction unit configured to model a trend of a subsequent electric power demand based on the similarity calculated by the similarity calculation unit;

and a demand forecast unit configured to forecast an electric power demand based on forecast weather data of a forecast target day from the trend of a subsequent electric power demand modeled by the demand forecast model construction unit, wherein the similar period search condition setting unit sets, as the target period, a plurality of forecast weather groups in a period comprising a plurality of days including a forecast target day for forecasting the electric power demand, and a plurality of actual weather groups in a period in a plurality of days in the past, wherein the similarity calculation unit calculates the similarity between the forecast weather group and the plurality of actual weather groups, wherein the demand forecast model construction unit models a trend of a subsequent electric power demand using an actual weather group selected based on comparison of the plurality of calculated similarities, and wherein the demand forecast unit calculates an electric power demand of a forecast target day.

According to the present invention, a plurality of forecast weather groups in a period comprising a plurality of days including a forecast target day for forecasting the electric power demand and a plurality of actual weather groups in a period in a plurality of days in the past are set, and by comparing these similarities, a trend of a subsequent electric power demand is predicted, and the electric power demand of a forecast target day is predicted from the predicted trend. Even if the forecast weather data of the forecast target day has an error, an electric power demand trend till the forecast day can be known, and therefore a more accurate and reliable demand can be provided.

BRIEF DESCRIPTION OF THE DRAWINGS

FIG. 4 shows examples of items and data of a database, and an example of data.

FIG. 6 shows an example screen for setting the period ranges of a forecast weather group and an actual weather group.

FIG. 7 shows an example of a screen for selecting the weather items for similarity calculation and setting the weighting factor thereof.

FIG. 8 shows an example of a screen for selecting a similarity calculation method.

FIG. 10 shows an example of a screen displaying a result of calculating similarity in the form of a table.

FIG. 14 shows an example of a screen for selecting the weather items used to prepare a demand forecast model.

FIG. 15 shows an example of a screen showing a decreasing rate.

FIG. 16 shows an example of a screen for setting an actual weather group and a rate of increase thereof.

FIG. 17 shows an example of a screen displaying a demand forecast result.

DETAILED DESCRIPTION OF THE EMBODIMENT

Hereinafter, an embodiment of the present invention will be described in detail with reference to the accompanying drawings.

Embodiment 1

Figure 1:
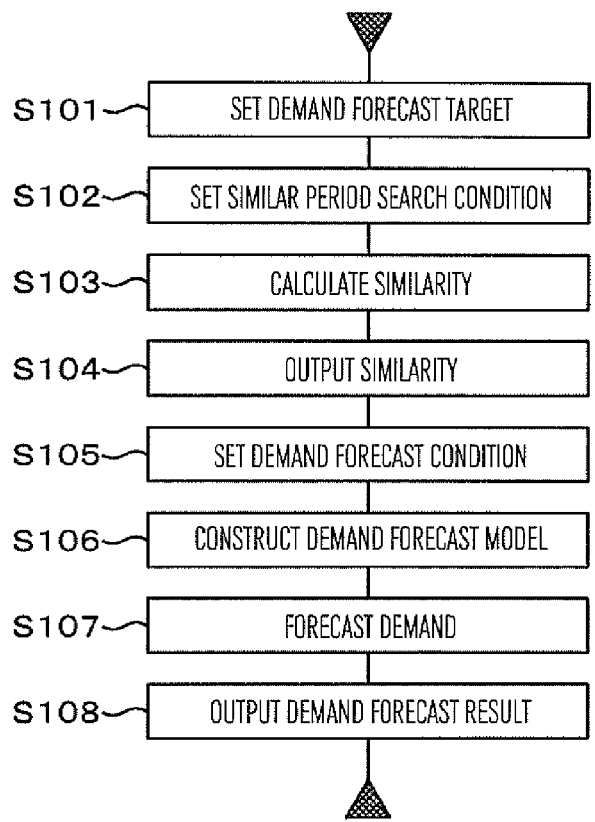
FIG. 1 shows a process flow of demand forecast.
Figure 2:
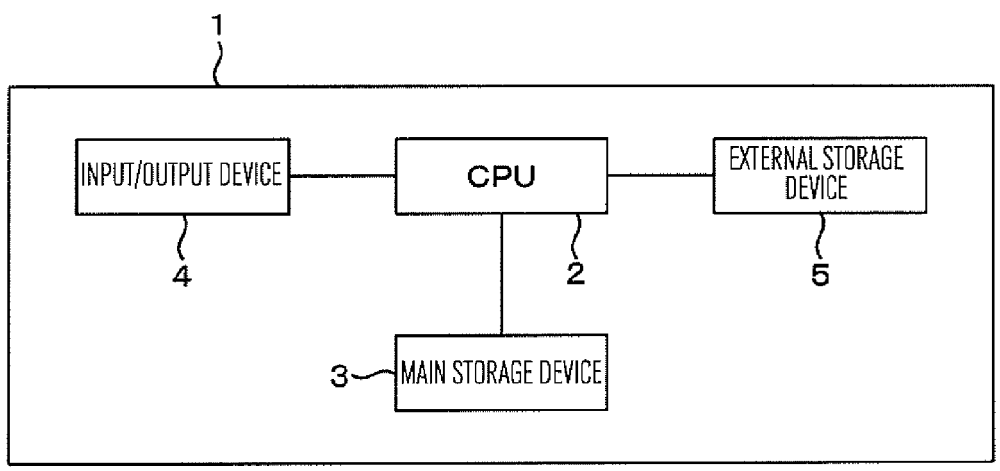
FIG. 2 shows an overall configuration of a demand forecast device.
Figure 3:
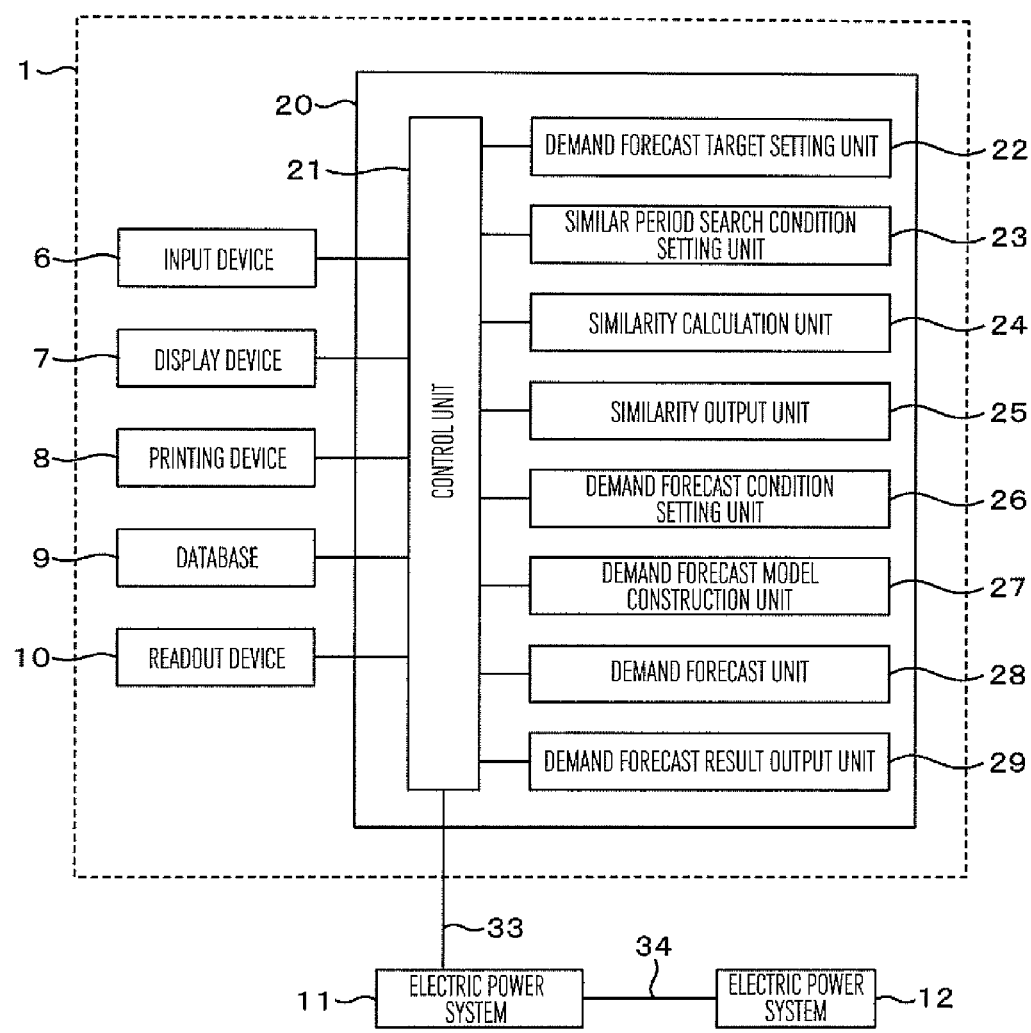
FIG. 3 shows a detailed configuration of the demand forecast device.

FIG. 1 shows a calculation process flow performed by a demand forecast device of an application of the present invention, FIG. 2 shows a schematic diagram of the overall configuration of a demand forecast device 1, and FIG. 3 shows a detailed configuration diagram of the demand forecast device.

The demand forecast device 1 comprises a central processing unit (CPU) 2, a main storage device 3, an input/output device 4, and an external storage device 5.

FIG. 3 is a detailed functional configuration diagram of the demand forecast device 1 in the present invention. The demand forecast device 1 includes an input device 6, a display device 7, a database 9, a readout device 10, and a calculation processing unit 20. Note that, the calculation processing unit 20 is realized by a program, which is held in advance in a storage medium of the external storage device 5 and read into the main storage device 3 via the readout device 10, executed by the CPU 2, but the present invention is not limited to such a programmed general-purpose processor. For example, the calculation processing unit 20 can be also configured with a combination with specific hardware including a wired logic for executing each process of the present invention.

The input/output device 4 includes the input device 6 provided with a keyboard and/or a mouse and the display device 7 as an output device as shown in FIG. 3. Note that, as the input/output device 4, in place of these or in combination with these, input devices, such as a pointing device and a touch sensor, and output devices, such as a liquid crystal display device, a printing device, a speaker, can be also provided. As the external storage device 5, a hard disk device, a floppy disk device, a CD-ROM (compact disc-read only memory) device, a DAT (digital videotape) device, a RAM (random access memory) device, a DVD (digital video disc) device, a nonvolatile memory, and the like can be used. In the external storage device 5, a large capacity storage device for holding the database 9 shown in FIG. 3, a storage medium for holding a processing program and the like, and the readout device 10 for reading the information held in this storage medium are used. However, both the database and the processing program can be held in one external storage device. Moreover, as the storage medium, a floppy disk, a CD-ROM, a magnetic tape, an optical disk, a magneto-optical disc, a DAT, a RAM, a DVD, a nonvolatile memory, and the like can be used.

The input device 6 selects options displayed on the display device 7, receives input data, and the like, and transmits the same to the calculation processing unit 20. The display device 7 displays the data sent from the input device 6. The calculation processing unit 20 prepares an operation plan of a supply capability based on the data transmitted from the input device 6, the data read from the database 9, the processing program read from the readout device 10, and the data transmitted from and electric power system 11. The electric power system 11 includes a database that is not illustrated. The electric power system 11 carries out the planning, monitoring, and controlling of an electric power line 12.

The processed result of the calculation processing unit 20 is sent to and displayed on the display device 7, and also stored into the database 9. Moreover, when a demand forecast under weather/regional conditions, which an operational/planning system and a monitoring/control system of the electric power system 11 set, is requested, the demand forecast and forecast result prepared by the calculation processing unit 20 are reported also to the electric power system 11. The electric power system 11 upon receipt of this report outputs an output control signal in order to plan and control the electric power line 12 based on the reported demand forecast value, and performs the planning and/or controlling for operating the equipment and the like of the electric power system, and also captures the actual electric power demand data for each region from the electric power line 12, and stores the captured data into an internal database (not shown).

The calculation processing unit 20 includes a control unit 21, a demand forecast target setting unit 22, a similar period search condition setting unit 23, a similarity calculation unit 24, a similarity output unit 25, a demand forecast condition setting unit 26, a demand forecast model construction unit 27, a demand forecast unit 28, and a demand forecast result output unit 29. Moreover, the calculation processing unit 20 is coupled to the external electric power system 11 via a transmission line 33, and the electric power system 11 is coupled to the electric power system 12 which is the actual power transmission/generation/substation facility. The electric power system 11 includes: a system for planning/operating and controlling the electric power system 12; the electric power system 12; and a database, which is not illustrated, for holding the information indicative of the state and the like of the electric power system 12. The state of the electric power system 12 is detected by a sensor, a relay, or the like, and is reported to the electric power system 11 via the transmission line 34 and stored into the database (not shown) of the electric power system 11.

The control unit 21 carries out the manipulation/processing of data for smoothly performing the transfer of data, a processing program, and the like between the electric power system 11 and the above-described each processing unit inside the calculation processing unit 20, and controls this transfer, thereby normally operating the overall process.

The demand forecast target setting unit 22 reads, via the control unit 21, a calendar; a demand component; weather items, such as barometric pressure, an amount of rainfall, temperature, humidity, wind velocity/wind direction, daylight hours, snow, and general weather conditions; a day of the week; singularity; abnormal demand; and the like, which are held in storage media of the database 9 and/or of the readout device 10, as shown in FIG. 4, and displays the same on the display device 7, and changes the conditions for calculating similarity and the conditions for predicting the demand, as required. Here, the weather data publicized by the Meteorological Agency are set to the weather items, however if an item is added in the future, the added data will be also stored and utilized. Also when a variable candidate affecting the demand is newly found, this can be stored as data and be utilized. Moreover, this modified new condition is stored into the database 9, the main storage device 3, and the like via the control unit 21, and this data is also transmitted to other processing unit inside the calculation processing unit 20 via the control unit 21. Note that, in the embodiment, unless otherwise specifically described, each processing unit inside the calculation processing unit 20 reads data from the database 9, transfers the data from/to each other via the control unit 21, and also outputs the data and calculation result input from the input device 6 to the display device 7 as required, and stores the same into the database 9.

The similar period search condition setting unit 23 sets or reads, via the control unit 21, forecast target conditions, such as the setting of the number of days of a forecast weather group, an actual period to search or its number of days, a similarity variable of weather data, such as temperature and humidity, for calculating similarity, a weighting factor of the similarity with respect to the selected actual weather group, and a similarity evaluation technique, which are stored in the storage media of the database 9 and/or of the readout device 10, and displays the same on the display device 7, and changes or sets the condition as required. Moreover, these set or modified condition are stored into the database 9, the main storage device 3, and the like via the control unit 21, and these data are transmitted to other processing unit inside the calculation processing unit 20 as required via the control unit 21.

The similarity calculation unit 24, based on the conditions set by the similar period search condition setting unit 23 via the control unit 21 and held in the storage media of the database 9 and/or of the readout device 10, calculates similarity and stores the calculation result into the database 9 and the main storage device 3 via the control unit 21. Here, the similarity between a forecast weather group and an actual weather group is calculated, but a distance serving as the inverse indicator of the similarity may be used. That is, the fact that the similarity is high (the both weather groups are similar) means that the similarity indicator is high, and when the distance is used as the indicator, it means that the numerical value of the indicator is small. On the contrary, the fact that similarity is low means that the similarity indicator is low, and when the distance is used as the indicator, it means that the numerical value of the indicator is large.

The similarity output unit 25 outputs the information related to the similarity calculated by the similarity calculation unit 24 to the display device 7 or the printing device 8 via the control unit 21. The information is displayed to an administrator in an easily understood manner using a text, a graph, or a table. From the similarity for each period of an actual weather group, an actual weather group to utilize is selected. The information related to the displayed similarity and the information related to the selected actual weather group are stored into the database 9, the main storage device 3, and the like.

The demand forecast condition setting unit 26 reads, via the control unit 21, a calendar; a demand component; weather items, such as barometric pressure, an amount of rainfall, temperature, humidity, wind velocity/wind direction, daylight hours, snow, and general weather conditions; a day of the week; singularity; abnormal demand; and the like, which are held in storage media of the database 9 and/or of the readout device 10, and displays the same on the display device 7, and selects the data, conditions, and the like to be used by the demand forecast model construction unit 27, or changes the conditions as required. These conditions and data are stored into the database 9, the main storage device 3, or the like.

The demand forecast model construction unit 27 reads the conditions and data, which are set by the demand forecast condition setting unit 26, from the database 9 via the control unit 21, the main storage device 3, or the like, and constructs a demand forecast model. The constructed demand forecast model is stored into the database 9, the main storage device 3, or the like.

The demand forecast unit 28 reads, via the control unit 21, the demand forecast model prepared by the demand forecast model construction unit 27, and forecasts a demand by inputting the weather forecast of a forecast target day into this read demand forecast model. This predicted result is stored into the database 9, the main storage device 3, or the like.

The demand forecast result output unit 29 outputs the information, such as the conditions, data, and results set by each of the processing unit of the demand forecast target setting unit 22, the similar period search condition setting unit 23, the similarity output unit 25, the demand forecast condition setting unit 26, and the demand forecast unit 28. Output destinations are the display device 7, the printing device 8, and the like.

Next, the operation of a power plant operation/planning device of the present invention is described with reference to the process flow diagram shown in FIG. 1.

The demand forecast target setting in a process S101 is made by the demand forecast target setting unit 22. Here, the target for demand forecast that has been displayed on the display device 7 is selected. The target for demand forecast is a forecast target day, the forecast of the maximum demand and minimum demand of the forecast target day, the demand forecast for 1 hour or 30 minutes around a specified time. By repeating the demand forecast for 1 hour of a specified demand forecast day, the demand at 24 time points on one day can be also predicted. These setting conditions are input from the input device 6, and once the setting conditions are determined, the demand forecast target setting unit 22 stores the result into the database 9, the main storage device 3, or the like.

Figure 5:
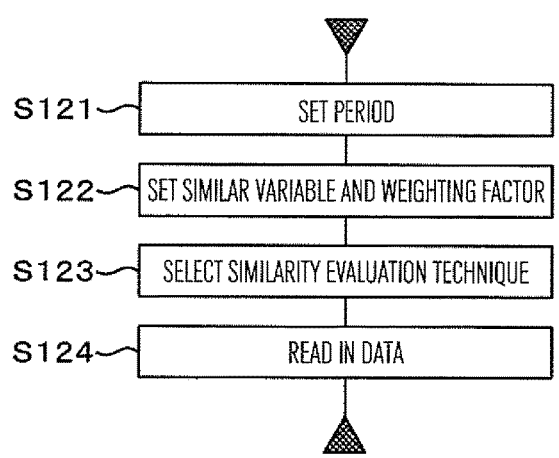
FIG. 5 shows a detailed process flow of similar period search condition setting.

A process S102 is the process of setting the conditions for detecting a similar period, and is handled by the similar period search condition setting unit 23. The detailed process flow of this process comprises processes S121-S124 as shown in FIG. 5. In the process S121, a period for calculating the similarity between groups is set. An example screen of this is shown in FIG. 6. In FIG. 6, the periods of a forecast weather group and an actual weather group are set. In the forecast weather group, the "number of days" and the "end" day in the actual are input from the input device 6. Thus, the "start" day is automatically calculated and displayed. The "number of days" and the "end" day in the forecast are input from the input device 6. Thus, the "start" day is automatically calculated and displayed. The "number of days" in the forecast is for setting a period for forecast, and one certain day may be set or a number equal to or greater than two of days may be set. The weather data for a total number of days included in these forecast weather groups is utilized for calculation of similarity. For an actual weather group serving as a target for calculating this similarity, the "number of days" and the "end" day in the actual are input from the input device 6. Thus, the "start" day is automatically calculated and displayed. The number of days of an actual weather group shall have the same value. Here, the reason for specifying the start day and end day is as follows. If similarity is calculated for all the periods in the past, it takes a calculation time, and even if the weathers are similar but when seasons are completely different, the data is not appropriate. Therefore, the start and end days are set to screen the periods in the past to some extent. As an actual weather group, the target for calculating similarity is not limited to the previous year, but by the setting here, the similarity may be calculated back to several years ago, such as the year prior to the previous year. This is an example of setting a total number of days of the forecast weather group to be the same as the number of days of the actual weather group.

The process S122 is the process of setting a similarity variable and a weighting factor. An example of the screen for setting these is shown in FIG. 7. The items displayed here are the weather data items shown in FIG. 4. Adoption or non-adoption of a variable used for similarity calculation in each data item is set by the input device 6. A symbol "◯" is set to the item to adopt and a symbol "×" is set to the item not to adopt. Moreover, because the dimension of each item differs, when similarity is calculated for each item, weighting calculation is made and then an overall similarity is calculated. The weighting factor of the item not to adopt is set to 0.00. Moreover, when the weighting factor is 0.00 in spite of the fact that the item is adopted, the similarity calculated with its variable will actually not be taken into consideration. Here, because wind direction and general weather conditions are not numerical values, these shall be converted into numbers in order to calculate similarity.

The process S123 is the process of selecting a similarity evaluation technique. A screen for selecting a similarity evaluation technique is shown in FIG. 8. The calculation process using specific formulas will be described in a process S103.

Here, two techniques of "Euclidean distance" and "vector angle similarity" are displayed. Techniques for evaluating similarity other than these techniques can be added. The data to use are the forecast weather group set in the process S121 and the variable set in the process S122 of the target period of an actual weather group. The value of a variable corresponding thereto is read from a database in the process S124. When in the Euclidean distance, a group average method for an individual group is employed (this is denoted by "◯"), for each corresponding variable of a forecast weather group and an actual weather group the distance is calculated with respect to all the combinations of data between both groups. Because the distance is calculated for each one variable, the distance here is the absolute value of a difference between the values of the variable. The distance is the inverse indicator of similarity, and therefore as a method of replacing the distance with similarity, the reciprocal of the distance is used. However, in order to prevent the distance from becoming zero, a positive base amount is added to the distance and thereafter the reciprocal of the result is used. When in the Euclidean distance, "whole group" is selected, the average value, the maximum value, the minimum value, and the standard deviation of the variable of the forecast weather data for the whole set period are utilized as new variable values. Similarly, statistical data, such as the average value, the maximum value, the minimum value, and the standard deviation of the variable of the weather record are utilized as new variable values. Statistical data items other than these may be displayed so as to be selected. For these values of the whole group, the Euclidean distance is calculated. However, only the employed item (denoted by "◯") among the whole group becomes the target. If the Euclidean distance is used in this manner, then for example, when the values of the highest temperature are similar between a forecast weather group and an actual weather group, the Euclidean distance decreases. The smaller the Euclidean distance, the higher the similarity becomes, so selecting the higher one is the best. Next, a case is described, where the vector angle similarity is used. When the group average method for an individual group is used, the value of a variable item is expressed with a vector and an angle (cosine) formed by two vectors is calculated. The smaller this cosine angle, the more similar the two variable items become. With regard to the whole group, statistical data, such as the average value, the maximum value, the minimum value, or the standard deviation selected for each variable item, is used as a vector, and an angle (cosine) formed by two vectors is calculated. When the vector angle similarity is selected, the smaller this value, the more similar the two variable items become, so there is no need to evaluate using the reciprocal thereof or the like, and the base amount is set to zero.

In the process S124, the data of a variable item set in the process S122 with respect to the period set in the process S121 is read from the database 9.

In the process S103, based on the conditions set in the process S123 and the read data, the similarity is calculated by the similarity calculation unit 24. Now, this is described using specific calculation formulas. When the Euclidean distance and the group average method are selected in the process S102, a distance Dp (u, v) is calculated using Formula 1.

$$D_p(u_i, v_j) = \|u_i - v_j\| = \left(\sum_{k=1}^{N}(u_{ik} - v_{jk})^2\right)^{1/2} \quad \text{[Formula 1]}$$

$$u_i = (u_{i,1}, u_{i,2}, \ldots, u_{i,N})$$

$$v_i = (v_{i,1}, v_{i,2}, \ldots, v_{i,N})$$

Here, a suffix p represents the name of a variable. For example, p represents the highest temperature. A variable u represents a data variable of a forecast weather group, and its value is the highest temperature, and N represents a total number of days. A variable v represents a data variable of an actual weather group, and its value is the highest temperature, and M represents the number of days. Because there is one variable, the vector is one dimensional.

Formula 2 represents an average sum Dp of the distance of all the combinations of values of each group, the values being obtained by individually using the group average method. Because the number of all possible combinations is N×M, the sum of the distances of all the combinations of values of each group is divided by this value for averaging.

$$D_p = \frac{\sum_{i=1}^{N}\sum_{j=1}^{M}D_p(v_i, w_j)}{N \times M} \quad \text{[Formula 2]}$$

In Formula 3, a weighted distance D of variables including the highest temperature and the other valuables is calculated. Here, the weight is the value set in the process 122 of the process 102.

$$D = \sum_{p=1}^{P} w_p D_p \quad \text{[Formula 3]}$$

Finally, a similarity S is calculated using Formula 4. α is the value of the base value set in the process S123.

$$S = \frac{1}{\alpha + D} \quad \text{[Formula 4]}$$

As the other calculation method, in the vector of Formula 1 the highest temperatures of the whole forecast weather group may be chronologically arranged. Similarly, in the vector of Formula 1, the highest temperatures of the whole actual weather group may be chronologically arranged. Then, in order to calculate the difference of the highest temperature of the both weather groups, the numbers of days for the period of the both weather groups need to be the same.

Next, a case is described, where the vector angle similarity is used.

Formula 5 represents a similarity Sp using a cosine angle. The denominator represents a product of the magnitudes of the respective vectors and the numerator represents the inner product of the vectors.

$$S_p(u_i, v_j) = \frac{u_i \cdot v_j}{\|u_i\| \cdot \|v_j\|} \quad \text{[Formula 5]}$$

In Formula 6, an average of the whole period is calculated as with Formula 2.

$$S_p = \frac{\sum_{i=1}^{N}\sum_{j=1}^{M}S_p(v_i, w_j)}{N \times M} \quad \text{[Formula 6]}$$

In Formula 7, the similarity Sp is calculated by weighted-average using the weighting factor set in the process S122, as with Formula 3. Here, because the similarity is employed, there is no need to calculate a reciprocal as with the Euclidean distance and to add a base amount.

$$S = \sum_{p=1}^{P} w_p S_p \quad \text{[Formula 7]}$$

In the above, the method of calculating the similarity between a forecast weather group and an actual weather group has been demonstrated. The "end" day to the "start" day of the forecast weather group are fixed, but in the actual weather group, while varying the start day within a period from the "end" to the "start", the similarity in each period is calculated, These calculation results are stored into the database 9, the main storage device 3, or the like.

In a process S104, the calculation result of the similarity calculated in the process S103 is output, and the calculation result is processed by the similarity output unit 25. The calculation result processed by the similarity output unit 25 is output to the display device 7 or the printing device 8.

Figure 9:
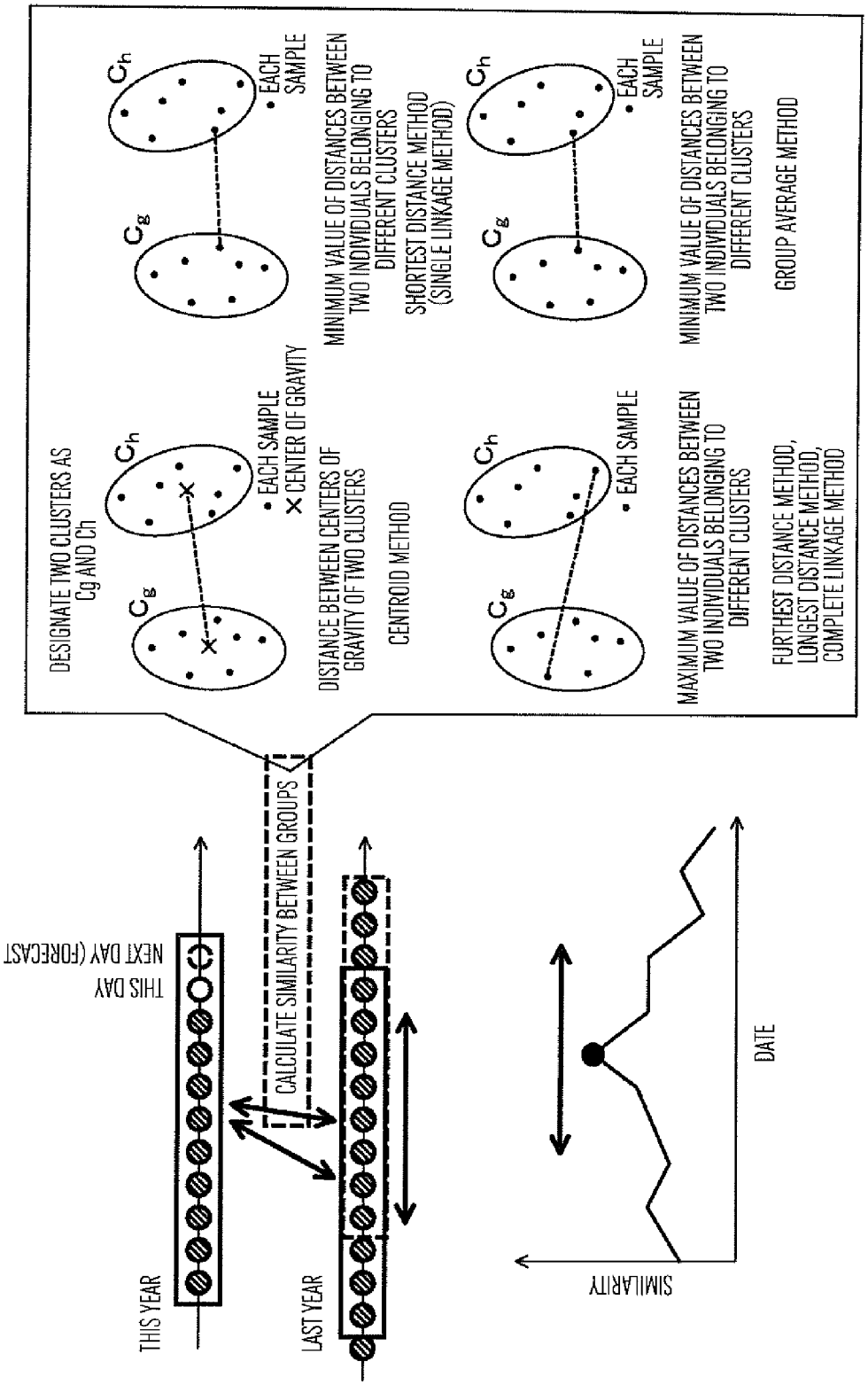
FIG. 9 shows an example simply representing a method of calculating a similarity between groups.

FIG. 9 shows an example view schematically illustrating a method of calculating the similarity between groups. Here, while varying the period of an actual weather group related to a plurality of days last year with respect to a forecast weather group related to a plurality of days including a forecast day (the next day, in the view) this year, the similarity between the both is calculated. Moreover, the similarity may be calculated by extending the period related to a plurality of days of the forecast weather group. Here, the similarity is calculated by clustering the weather forecast group this year and the actual weather group last year. The examples of this technique include a shortest distance method (single linkage method), a longest distance method, and a group average method, a Ward method. Here, in the shortest distance method, similarity is calculated from the minimum value of the distances between two individuals belonging to different clusters, while in the longest distance method, similarity is calculated from the maximum value of the distances between two individuals belonging to different clusters. Moreover, in a centroid method, similarity is calculated by calculating a distance between the centers of gravity of two clusters, while in the group average method, similarity is calculated by averaging the distances between all the pairs of points. In the Ward method, similarity is calculated by minimizing a summation of the square of the distance from each target to the centroid of a cluster including this target.

Figure 11:
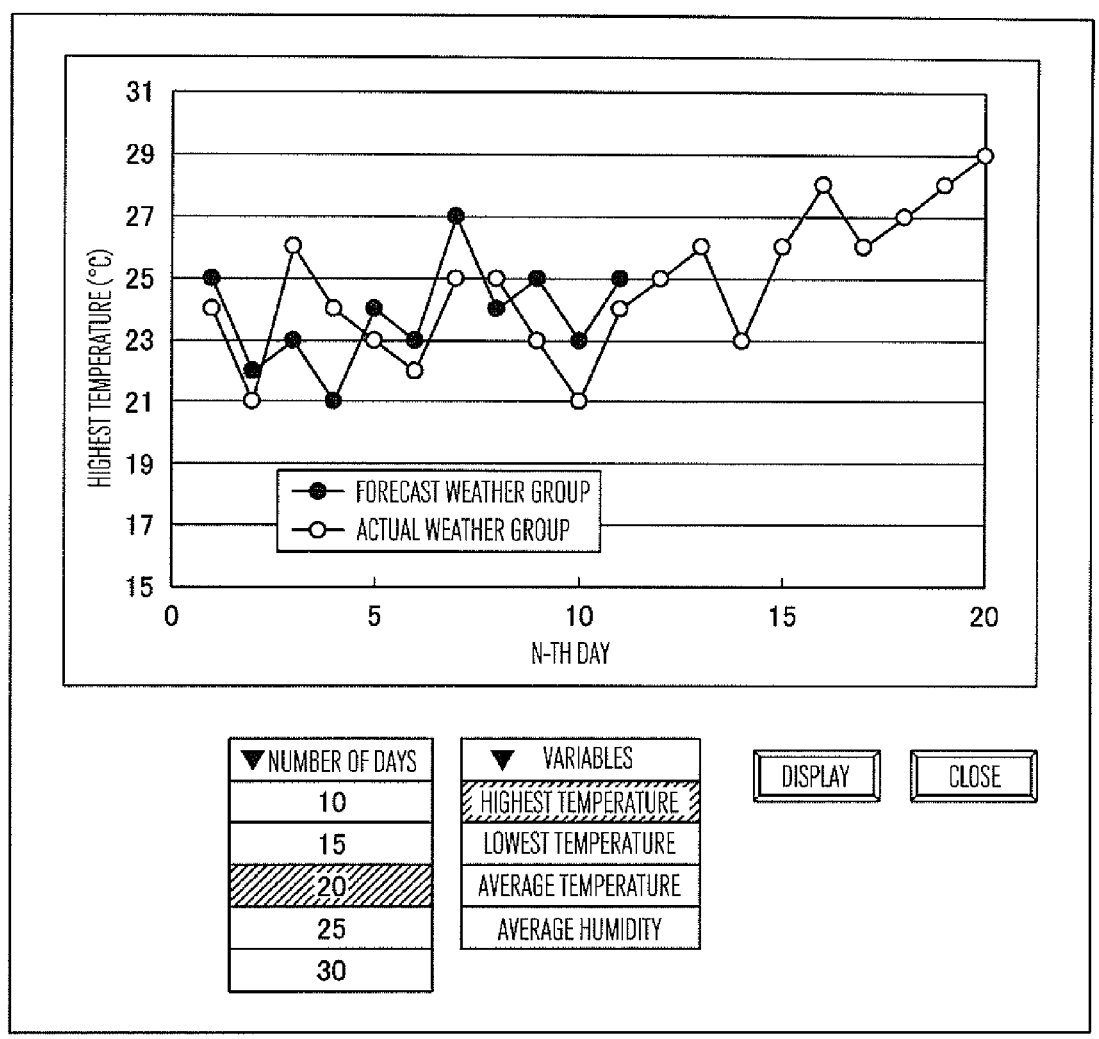
FIG. 11 shows an example of a screen displaying the items of similarity in the form of a graph.

Moreover, FIG. 10 shows an example of a screen, wherein the similarity calculated using the above-described technique is output in the form of a table. An item employed as an actual weather group is selected with a selection button. As default, an item with the highest similarity or with the closest distance shall be selected. Because this example shows a result obtained by using the Euclidean distance, the first row of the table shows the date, a distance, and the respective distances of the highest temperature, the lowest temperature, the average temperature, and the average humidity employed as the variables. The final distance is a value obtained by multiplying a weighting factor of the final line to the distance of each variable and adding this result. The variables and the weighting factors are the variables and weighting factors set in FIG. 7. When the vector angle similarity is selected in FIG. 8, accordingly in the first row of FIG. 10 the similarity is displayed next to the date. If the date is "selected" with a button and subsequently a "variable graph" button is clicked, a graph shown in FIG. 11 will be displayed. In FIG. 11, among the variables used to calculate the similarity, a variable and the number of days are selected. The background of the selected one is hatched. Here, the default is the first variable of FIG. 10 and the variable with the larger number of days in the forecast weather group and the actual weather group. The N-th day in the horizontal axis of FIG. 11 denotes the number of days from the first day of the forecast weather group, and similarly denotes the number of days from the first day of the actual weather group. Because the number of days in the actual of the forecast weather group set in FIG. 6 is ten days and the number of days in the forecast is one day, ten points from the left in the horizontal axis of the points of a polygonal line of the forecast weather group represent the highest temperatures for the number of days in the actual and the subsequent one point represents the highest temperature for the number of days in the forecast. Moreover, in the actual weather group, there are shown the highest temperatures for a total of 20 days comprising 11 days of the selected number of days in the actual and the subsequent nine days. This is to be referred to when setting a period for use in preparing a demand model with reference to the period of the actual weather group used in the next process. Here, the "number of days" and the "variable" are modified with a pull-down menu, respectively, and a "display" button is clicked whereby a graph is displayed under the changed conditions.

Figure 12:
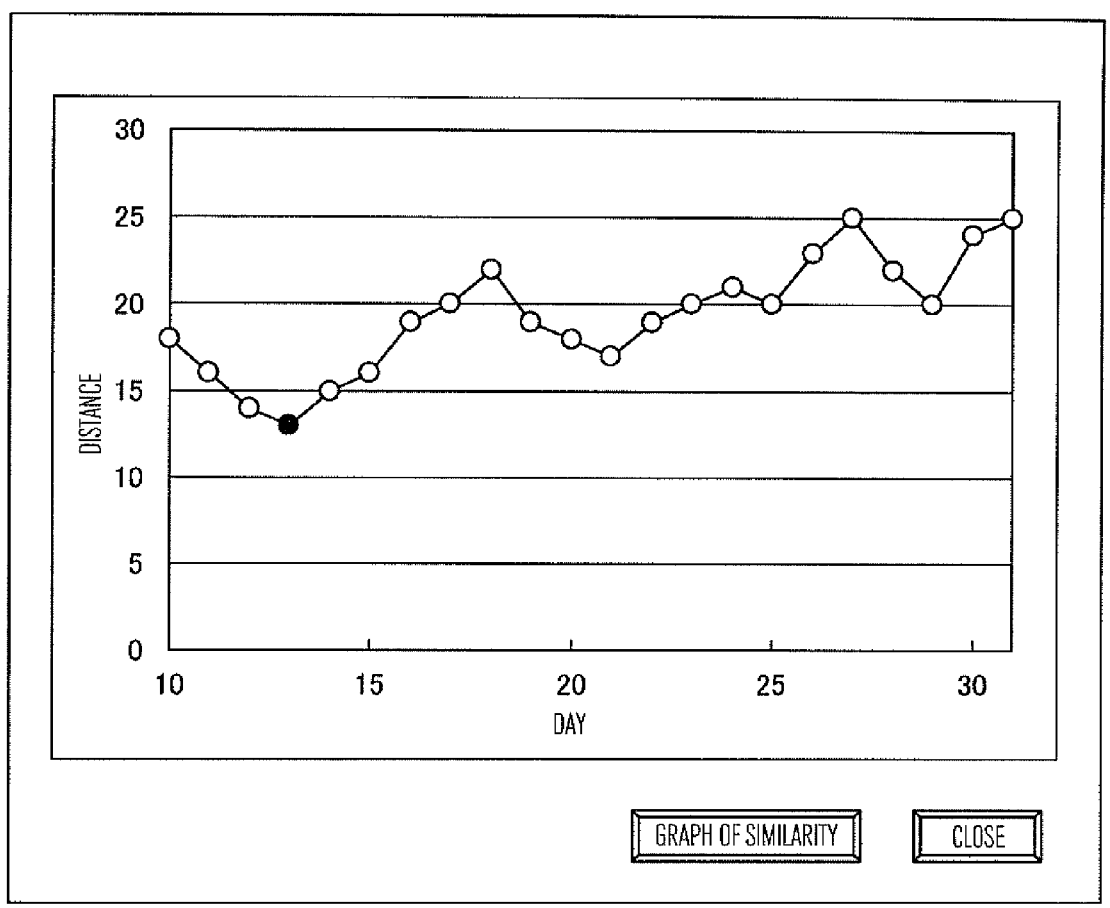
FIG. 12 shows an example of a screen displaying a result of calculating distance in the form of a graph.
Figure 13:
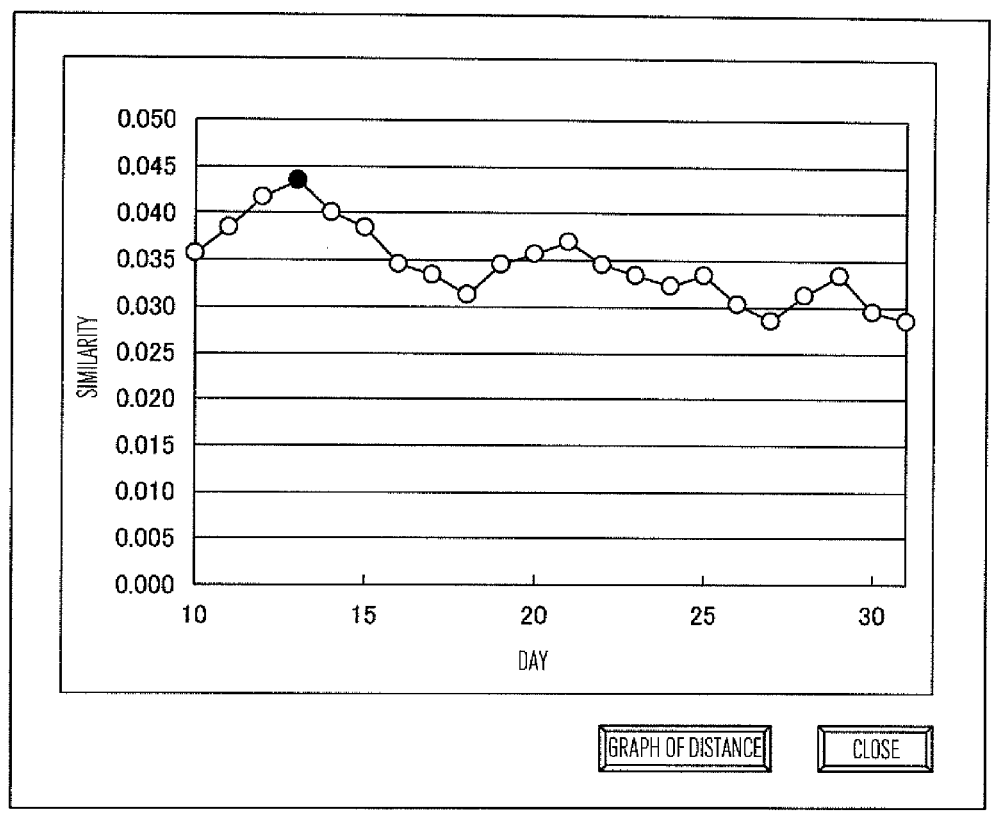
FIG. 13 shows an example of a screen displaying a result of calculating similarity in the form of a graph.

Moreover, if a button of "similarity graph" of FIG. 10 is clicked, a graph showing a variation in the "distance", which is the evaluation index of FIG. 10, is displayed as shown in FIG. 12. If a button of "similarity graph" is clicked in FIG. 12, a graph showing a variation in the "similarity" shown in FIG. 13 will be displayed.

In a process S105, various kinds of conditions are set while referring to the calculation result of similarity calculated in the process S103 and the output of the process S104. The process S105 is handled by the demand forecast condition setting unit 26. An example of a screen for selecting the variables for use is shown in FIG. 14. The variables selected by default are the variables set in FIG. 7 which were the variable used for analysis. "◯" is set to a variable to employ and "x" is set to a variable not to employ. FIG. 15 shows a screen for setting a decreasing rate. Numerical values as default are displayed, and are modified as required. Here, the conditions, such as a day of the week and a holiday, are read from the database shown in FIG. 4. In the demand forecast of a day of the week and of singularity, the demand decreases on Saturday, Sunday, or holiday relative to the normal days from Monday through Friday. Moreover, a certain amount of actual data is needed to prepare a demand forecast model, but because the number of days of Saturday, Sunday, or holiday in the same time period is fewer, a demand forecast model is prepared using the actual data of normal days and subsequently a corresponding decreasing rate shown in FIG. 15 of a forecast target day is multiplied, thereby predicting a demand. For the decreasing rates of FIG. 15, a decreasing rate located lower in the table under certain conditions is used. For example, when the target day is Tuesday and is a holiday, the decreasing rate is set to 1.00 once, but because there is a holiday thereafter in the table, 0.60 will be employed as the decreasing rate in this case. GW (Golden Week), Bon Festival, or year end and new year days are determined from the content given in the singularity of the actual data shown in FIG. 4. FIG. 16 shows actual weather data as default used for preparing a demand forecast model when the similarity is the highest or the distance is the nearest. For this reason, Jul. 13, 2010 when the similarity is the highest or the distance is the nearest in FIG. 10 is set to the start day of the actual weather group. The forecast weather data and actual weather data displayed by default can be changed. For example, by setting the start day of actual weather data to the same day and changing the number of days for use from 11 days as default to 16 days, the days ahead of a similar period may be included, so that the weather assumed ahead of a forecast target day can be also taken into consideration. Not one actual weather group but a plurality of actual weather groups may be set and the number of days may be varied for each group. Because the actual demand data in the past is used, the rate of increase is used to convert the actual demand data to a demand at a time point of a forecast target day. When a plurality of actual weather groups are set, this numerical value of the rate of increase is set for each actual weather group. In this manner, the data used to prepare a demand forecast model has been determined. Next, a method of preparing a demand forecast model is selected. The examples of the model generation method include a multiple regression analysis, a neural network, and PSO determining regression coefficients. The data to use is, among the specified forecast weather group and actual weather group, only the data satisfying the following conditions; that a "day of the week" shown in FIG. 4 is either one of Monday through Friday, that the "singularity" is a normal day, and that the "abnormal demand" is 0. That is, by using the data satisfying typical conditions in order to prepare a demand forecast model, the data of a day satisfying the conditions of the decreasing rate 1.00 shown in FIG. 15 is used.

A process S106 is handled by the demand forecast model construction unit 27 based on the modeling conditions set in the process S105. Here, an example of constructing a demand forecast model using multiple regression analysis is described. A multiple regression formula F(x) of Formula 8 is calculated using the period for use and variables.

$$F(x_k) = e_k + \sum_{i=1}^{m}\sum_{j=0}^{l(i)} a_{i,j} x_{k,i}^j \qquad \text{[Formula 8]}$$

A regression coefficient is denoted by "a". xk is the k-th data of a variable vector x. The value of the variable vector is a set of the highest temperature, the lowest temperature, the average temperature, and the average humidity. The number of variables m=4, wherein when the sequence i of the variable is 1, the variable is the highest temperature, when it is 2, the variable is the lowest temperature, when it is 3, the variable is the average temperature, and when it is 4, the variable is the average humidity. The order of each variable is I(j). In the method of calculating a regression coefficient, the regression coefficient is determined so that a square sum of errors e becomes the minimum. For each of the highest temperature, the lowest temperature, and the average temperature or average humidity which are the variables set in FIG. 14, the maximum order is set, and the optimum value of a regression coefficient is determined using the least square method. Furthermore, as a variable, a flag is set in order to take into consideration a yearly base amount. This flag is for indicating a forecast weather group, so the flag is set to 1 for a forecast weather group and set to zero for an actual weather group. Furthermore, if an actual weather group is across a plurality of years, a flag corresponding to each year is set. A regression coefficient for a weather variable corresponds to the sensitivity of demand with respect to each variable. For the flag, when this is 1, the flag indicates a variation in the base amount of demand relative to when it is 0. That is, the demand of a forecast target day increases from the previous year by the amount of the regression coefficient of this flag.

As a variable, not limited to weather, but an autoregression formula obtained by adding the actual demand prior to a forecast target day as a variable may be added.

As the demand forecast model, other than the multiple regression model, a demand forecast model may be prepared by causing a neural network to learn using the actual weather and actual demand of a forecast weather group and the actual weather and actual demand of an actual weather group. In the multiple regression model, when the model is made nonlinear by multiplying the rate of increase of the demand to the entire regression model, the regression coefficients can be determined using PSO (particle Swarm optimization) or the like.

In this manner, a demand forecast model can be constructed. This model is stored into the database 9 and the main storage device 3 via the control unit 21 from the demand forecast model construction unit 27.

In a process S107, by inputting forecast weather into the demand forecast model constructed in the process S106, demand is predicted by the demand forecast unit 28. For the forecast weather, a predicted value is calculated by inputting the highest temperature, the lowest temperature, the average temperature, and the average humidity of a forecast target day into Formula 9.

$$f(x_k) = \sum_{i=1}^{m}\sum_{j=0}^{l(i)} a_{i,j} x_{k,i}^j \qquad \text{[Formula 9]}$$

The above is an example of using the formula employing the multiple regression model, but also when a demand forecast model is prepared using a neural network or PSO, a predicted value is similarly calculated using the forecast weather, the actual demand, and the like.

In a process S108, the demand forecast value predicted in the process S107 and the information related thereto are processed by the demand forecast result output unit 29. The forecast result is output to the display device 7 or the printing device 8. FIG. 17 shows an example of displaying a demand forecast result. The items displayed are the forecast target day, the forecast demand, and the highest temperature, lowest temperature, average temperature, and average humidity which are the forecast weather.

Figure 18:
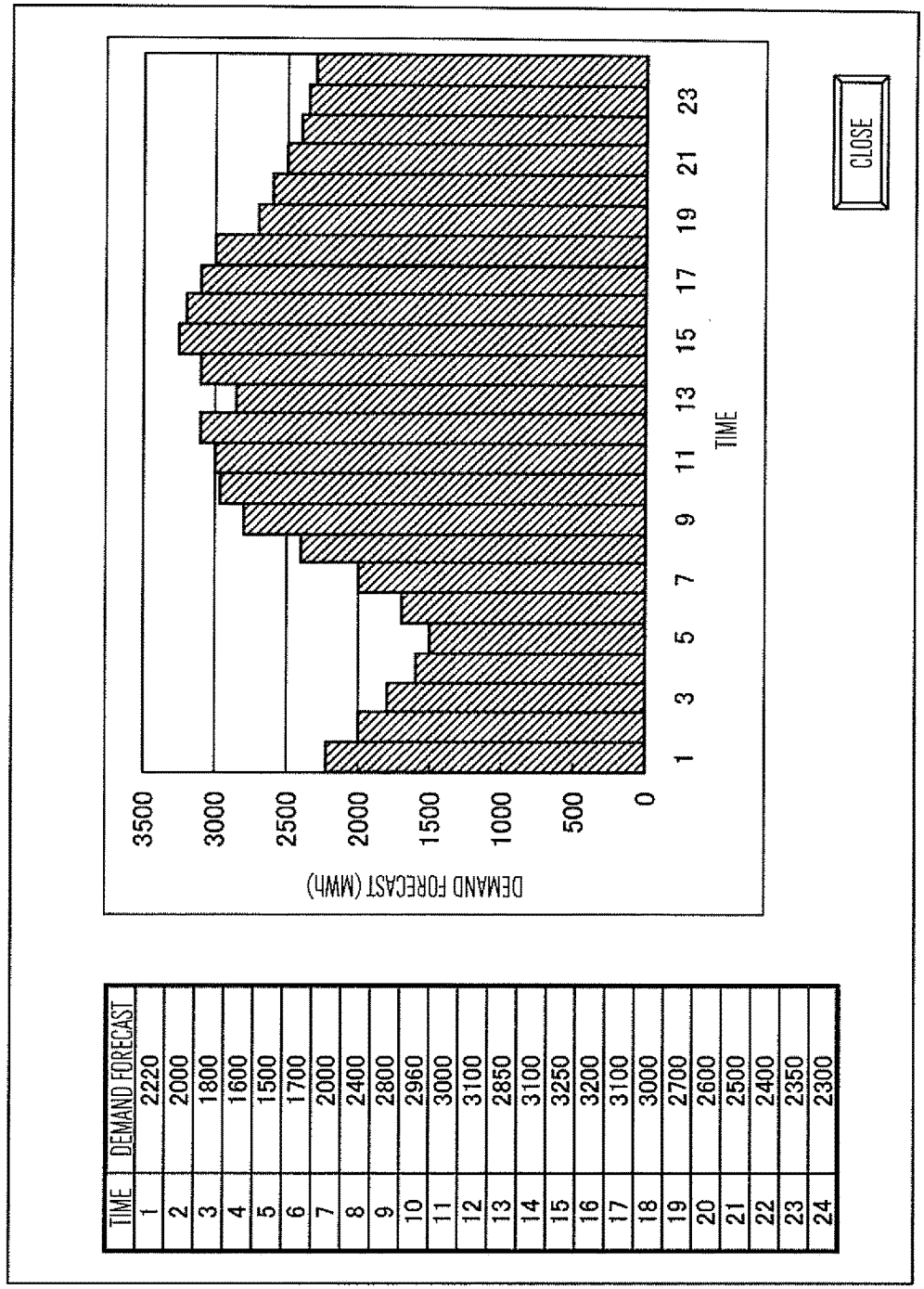
FIG. 18 sows an example of a screen displaying demand forecast results at 24 time points.

With the method described above, the demand at a certain time can be predicted. By repeating this with respect to 24 time points, the demand is predicted whereby a forecast demand in the form of a table with 24 time points and a forecast demand in the form of a graph with 24 time points, as shown in FIG. 18, are displayed.

According to the above-described embodiment of the present invention, a period of an actual weather group of the weather similar to the weather for a period, including a forecast target day and the days nearest thereto, of a forecast weather group is extracted, and the similarity of this extracted actual weather group is displayed, and a demand forecast model is prepared using this forecast weather group and the weather data and the actual demand of a period of an actual weather group. Then, by inputting the weather record, the actual demand, or the forecast weather into this demand forecast model, the demand of the forecast target day is predicted, and this forecast demand is displayed. As a result, an accurate demand forecast value can be calculated.

The invention claimed is:

1. An electric power demand forecast system which calculates a similarity between a weather record in the past and subsequent forecast weather data, and with the use of the similarity, which predicts a subsequent electric power demand from forecast weather data of a forecast target day and electric power demand data corresponding to the weather record, the system comprising:
   a demand forecast target setting unit configured to carry out condition setting for calculating the similarity;
   a similar period search condition setting unit configured to set a target period in which the similarity is calculated and to set a similarity variable associated with the condition for the target period and a weighting factor corresponding to the similarity variable, wherein the similarity variable is selectively adoptable or non-adoptable for similarity calculation by user input via an input device by selecting a first graphical symbol on the input device to adopt the similarity variable and selecting a second graphical symbol different from the first graphical symbol on the input device to not adopt the similarity variable, and if the condition is not or cannot initially be associated with a numerical value, the condition is converted into one or more numbers related to the condition in order calculate the similarity;
   a similarity calculation unit configured to calculate the similarity based on the condition set by the demand forecast target setting unit and based on the target period and the weighting factor for the similarity variable set by the similar period search condition setting unit;

a demand forecast model construction unit configured to model a trend of a subsequent electric power demand based on the similarity calculated by the similarity calculation unit; and a demand forecast unit configured to forecast an electric power demand based on forecast weather data of a forecast target day from the trend of a subsequent electric power demand modeled by the demand forecast model construction unit, wherein the similar period search condition setting unit sets, as the target period, a plurality of forecast weather groups in a period comprising a plurality of days including a forecast target day for forecasting the electric power demand, and a plurality of actual weather groups in a period in a plurality of days in the past, wherein the similarity calculation unit calculates the similarity between the forecast weather group and the plurality of actual weather groups, wherein the demand forecast model construction unit models a trend of a subsequent electric power demand using an actual weather group selected based on comparison of the plurality of calculated similarities, and wherein the demand forecast unit calculates an electric power demand of a forecast target day; and the electric power demand forecast system controls operation of equipment of an electric power system based on the calculated electric power demand.

2. The electric power demand forecast system according to claim 1, wherein the condition used to calculate the similarity include one or more of barometric pressure, a rainfall amount, temperature, humidity, wind direction, wind velocity, daylight hours, an amount of snowfall, weather, a day of the week, and singularity.

3. The electric power demand forecast system according to claim 1, wherein the similarity calculation unit weights all weighting factors for all similarity variables associated with the condition set for the target period used to calculate the similarity, and calculates the similarity.

4. The electric power demand forecast system according to claim 1, wherein the similarity calculation unit clusters a collection of data based on the conditions in the forecast weather group and the actual weather group, and calculates the similarity using cluster analysis.

5. The electric power demand forecast system according to claim 1, wherein the similarity calculation unit converts the collection of data based on the conditions in the forecast weather group and the actual weather group, and calculates the similarity using a cosine angle.

6. The electric power demand forecast system according to claim 1, wherein the demand forecast model construction unit predicts a trend of a subsequent electric power demand using a regression formula or a neural network, which calculates the trend using a least square method or particle Swarm optimization.

7. An electric power demand forecast method, which calculates a similarity between a weather record in the past and subsequent forecast weather data, and with the use of the similarity, which predicts a subsequent electric power demand from forecast weather data of a forecast target day and electric power demand data corresponding to the weather record, the method comprising the steps of:

setting a weather condition for calculating the similarity;

setting, as a target period, a plurality of forecast weather groups in a period comprising a plurality of days including a forecast target day for forecasting the electric power demand, and a plurality of actual weather groups in a period in a plurality of days in the past;

setting a similarity variable associated with the weather condition for the target period and a weighting factor corresponding to the similarity variable, wherein the similarity variable is selectively adoptable or non-adoptable for similarity calculation by user input via an input device by selecting a first graphical symbol on the input device to adopt the similarity variable and selecting a second graphical symbol different from the first graphical symbol on the input device to not adopt the similarity variable, and if the condition is not or cannot initially be associated with a numerical value, the condition is converted into one or more numbers related to the condition in order to calculate the similarity;

calculating the similarity between the forecast weather group and the plurality of actual weather groups based on the weather condition and the target period and the weighting factor for the similarity variable;

modeling a trend of a subsequent electric power demand based on comparison of the plurality of calculated similarities; and forecasting an electric power demand of the forecast target day based on the trend of the modeled subsequent electric power demand and forecast weather data of the forecast target day; and the electric power demand forecast system controls operation of equipment of an electric power system based on the calculated electric power demand.

* * * * *